United States Patent
Dehn et al.

(10) Patent No.: US 9,742,238 B2
(45) Date of Patent: Aug. 22, 2017

(54) METHOD FOR PRODUCING A HOUSING ARRANGEMENT, HOUSING ARRANGEMENT AND STAMPING APPARATUS

(71) Applicant: Brose Fahrzeugteile GMBH & Co. KG, Wurzburg, Wurzburg (DE)

(72) Inventors: Jochen Dehn, Wurzburg (DE); Marko Tomasovic, Ludwigsburg (DE); Sebastian May, Retzstadt (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 111 days.

(21) Appl. No.: 14/611,301

(22) Filed: Feb. 2, 2015

(65) Prior Publication Data

US 2016/0028287 A1 Jan. 28, 2016

Related U.S. Application Data

(63) Continuation of application No. 13/993,098, filed as application No. PCT/EP2011/004611 on Sep. 14, 2011.

(51) Int. Cl.
*H02K 5/04* (2006.01)
*H02K 5/15* (2006.01)
*H02K 15/14* (2006.01)

(52) U.S. Cl.
CPC .............. *H02K 5/04* (2013.01); *H02K 5/15* (2013.01); *H02K 15/14* (2013.01)

(58) Field of Classification Search
CPC . B21K 25/00; B23P 11/00; B21J 15/02; B21J 15/12; B21D 22/00; H05K 5/00; H02K 5/04; H02K 5/15; H02K 5/225; H02K 7/1163; H02K 15/00; H02K 15/14
USPC ................................... 29/596–598
See application file for complete search history.

(56) References Cited

U.S. PATENT DOCUMENTS

| 4,769,572 | A | | 9/1988 | Voigt |
| 4,853,576 | A | | 8/1989 | Mayumi et al. |
| 4,922,149 | A | * | 5/1990 | Isozumi ............ H02K 5/15 |
| | | | | 310/239 |

(Continued)

FOREIGN PATENT DOCUMENTS

| CN | 87103248 | 11/1987 |
| CN | 1328215 | 12/2001 |

(Continued)

OTHER PUBLICATIONS

PCT Search Report and Written Opinion PCT/EP2011/004611 dated Apr. 19, 2012.

(Continued)

*Primary Examiner* — Tran Nguyen
(74) *Attorney, Agent, or Firm* — Manelli Selter PLLC; Edward J. Stemberger (57) ABSTRACT

A method for producing a housing arrangement for a an electric machine provides a closure part and a carrier part. An opening of the carrier part is placed onto a spigot on the closure part. The spigot is shaped to engage behind the carrier part. A housing arrangement for an electric machine is also provided. The housing arrangement has a closure part and a carrier part fixedly connected to the closure part.

8 Claims, 5 Drawing Sheets

(56) References Cited

U.S. PATENT DOCUMENTS

| | | | | |
|---|---|---|---|---|
| 5,860,495 | A * | 1/1999 | Weiler | F16D 65/0979 188/250 E |
| 6,329,735 | B1 * | 12/2001 | Tanaka | H01R 39/385 310/239 |
| 6,553,645 | B2 | 4/2003 | Nakamura et al. | |
| 7,100,374 | B2 * | 9/2006 | Konig | B60T 11/20 60/562 |
| 7,290,569 | B2 * | 11/2007 | Gesing | D03C 9/0633 139/91 |
| 2002/0047391 | A1 * | 4/2002 | Nakamura | F04C 23/008 310/90 |
| 2002/0173395 | A1 * | 11/2002 | Reiter | F16G 13/06 474/231 |
| 2005/0109417 | A1 * | 5/2005 | Gesing | D03C 9/0633 139/55.1 |
| 2005/0198954 | A1 * | 9/2005 | Konig | B60T 11/20 60/562 |

FOREIGN PATENT DOCUMENTS

| | | |
|---|---|---|
| CN | 1204340 C | 6/2005 |
| DE | 1943053 A | 3/1971 |
| DE | 2249684 A1 | 4/1974 |
| DE | 2618832 A1 | 11/1977 |
| DE | 2706849 A1 | 11/1977 |
| DE | 102007013695 A1 | 9/2008 |
| DE | 102007060280 A1 | 6/2009 |
| GB | 1450186 A | 9/1976 |

OTHER PUBLICATIONS

Office Action in DE 102010041062.4 dated Jul. 27, 2011.
Examination Notice Summary in CN 201180055402.6 dated Mar. 24, 2015 and English translation thereof.
Office Action in Chinese Patent Application No. 201510175238.2 dated Jun. 1, 2016 and English translation thereof.

* cited by examiner

METHOD FOR PRODUCING A HOUSING ARRANGEMENT, HOUSING ARRANGEMENT AND STAMPING APPARATUS

FIELD OF THE INVENTION

The invention relates to a method for producing a housing arrangement, a housing arrangement and a stamping apparatus.

TECHNICAL BACKGROUND

Although applicable to any housing arrangement, the present invention and the problem forming the basis thereof are explained in more detail hereinunder in relation to a housing arrangement for an electric motor.

Document DE 19 43 053 describes a housing arrangement for an electric motor, which has a housing part and a closure part. The closure part is formed as a bearing plate. The closure part is riveted to the housing part. For this purpose riveting bolts are formed on the housing part. The riveting bolts extend axially through corresponding holes in the closure part. The rivet heads are formed behind the closure part as seen from the housing part, in order thereby to create a positive locking connection between the housing part and the closure part.

Furthermore, the applicant has in-house knowledge of a method for producing a housing arrangement for an electric motor. In the case of this method, a closure part is pried together with a housing part, i.e. a press fit is produced between the housing part and the closure part.

In the case of the first approach, described above, for producing a housing arrangement, it has proved to be disadvantageous that the provision of the riveting bolts is associated with considerable manufacturing outlay. In the case of the second approach, described above, it has proved to be disadvantageous that strong axial forces arise during the prying process and lead to deformation of the housing part.

SUMMARY OF THE INVENTION

The object of the present invention is to avoid the disadvantages described above.

This object is achieved by a method for producing a housing arrangement, in particular for an electric machine, wherein a region of a closure part is shaped in the form of an indent in order thereby to press material of the closure part against a housing part for a non-positive connection between the closure part and the housing part.

Furthermore, the problem is solved by a housing arrangement, in particular for an electric machine, having a housing part and a closure part, wherein a region of the closure part is shaped in the form of an indent, whereby material of the closure part is pressed against the housing part for a non-positive connection between the closure part and the housing part.

Furthermore, the problem is solved by a stamping apparatus for use in the method in accordance with the invention, having a plurality of stamps which can each be rotated at the same time about a middle axis of a respective indent to be formed, can be inclined at a varying angle with respect to the middle axis and can be advanced axially in relation to the middle axis, wherein the contact point of a respective stamp on the region can be moved along a hypocycloid in order thereby to displace the material essentially in an axial direction and tangential direction in relation to the middle axis, or having a plurality of stamps which can each be rotated at the same time about a middle axis of a respective indent to be formed, can be inclined at a constant angle with respect to the middle axis and can be advanced axially in relation to the middle axis, wherein the contact point of a respective stamp on the region can be moved along an inclined spiral, in order thereby to displace the material essentially in an axial and tangential direction in relation to the middle axis.

The idea forming the basis of the present invention is to shape a region of a closure part in the form of an indent in order thereby to create a connection between the closure part and a housing part. This is accordingly a matter of merely local shaping of the closure part, which leads to greater expansion of the closure part in the plane of the indent. However, if this expansion is limited or inhibited by the housing part, a non-positive connection is created between the closure part and the housing part. This non-positive connection is used in the present case to fixedly connect the housing part to the closure part.

The advantage of the approach in accordance with the invention is that no additional components such as screws, rivets or the like are required to connect the closure part to the housing part. Furthermore, the introduction of force into the closure part or the housing part is only slight owing to the merely local shaping of the closure part, for example, in comparison to the known prying procedure, which means that disadvantageous deformation of the housing part can be avoided.

Advantageous embodiments and developments of the present invention are apparent from the further subordinate claims and from the description taken in conjunction with the figures of the drawing.

"Indent" is to be understood in this case to mean a concave plastic deformation in the closure part. The indent preferably has a circular outer contour when seen in the plan view of the closure part.

According to an embodiment of the method in accordance with the invention, the shaping step is carried out by means of a stamp which is rotated about a middle axis of the indent to be formed and is inclined at a varying angle with respect to the middle axis, wherein the stamp is advanced axially in relation to the middle axis and the contact point of the stamp on the region follows a hypocycloid, whereby the material essentially flows in an axial and tangential direction in relation to the middle axis. This movement of the stamp corresponds to the movement also used during radial riveting. In this way, the indent can be formed in the closure part with comparatively low application of force, which means that excessive or any deformation of the housing part can be avoided.

According to a further preferred embodiment of the method in accordance with the invention, the shaping step is carried out by means of a stamp which is rotated about a middle axis of the indent to be formed and is inclined at a constant angle with respect to the middle axis, wherein the stamp is advanced axially in relation to the middle axis and the contact point of the stamp on the region follows an inclined spiral, whereby the material essentially flows in an axial and tangential direction in relation to the middle axis. The movement of the stamp corresponds to the movement also used during wobble riveting. This movement of the stamp also means that a comparatively only slight application of force is required to form the indent in the closure part, whereby, once again, excessive deformation or any deformation of the housing part can be avoided.

According to a further embodiment of the method in accordance with the invention, the region is shaped by means of a conical surface of the stamp. The conical surface facilitates formation of the indent.

According to a further embodiment of the method in accordance with the invention, a plurality of regions of the closure part are shaped in the form of an indent at the same time. In this way, the closure part is shaped consistently so that there is no distortion thereof or tilting thereof with respect to the housing part.

According to an embodiment of the method in accordance with the invention, the closure part is inserted into a receiving region of the housing part before the shaping step and is clamped to the receiving region by means of the shaping step. As already explained, the forming of the indent in the closure part leads to this closure part being enlarged in the plane of the indent. In order to use this enlargement for the non-positive connection, the closure part is inserted into a receiving region of the housing part in accordance with this embodiment. The enlargement of the closure part associated with the forming of the indent then leads to the closure part being clamped to the receiving region of the housing part. The clamping results from the fact that the closure part is pressed against, for example, two mutually opposing portions of the receiving region.

According to a further embodiment of the method in accordance with the invention, the closure part is formed with at least one lug which engages into a corresponding recess in the housing part, wherein the indent is formed in the lug. Initially, the lug serves to produce a positive locking connection between the closure part and the housing part, for example, in the peripheral direction of the housing part. Furthermore, the circumstance that the lug is confined by the recess on a plurality of sides, in particular opposing sides, means that the forming of the indent in the lug leads to a better non-positive connection between the lug and the corresponding recess.

According to a further embodiment of the method in accordance with the invention, an opening in a carrier part is placed onto a spigot on the closure part, wherein the spigot is shaped to engage behind the carrier part. The shaping of the spigot is preferably effected by wobble or radial riveting. This type of connection between the carrier part and the closure part has the advantage that it is easy to produce. Furthermore, no additional components, such as screws, are required. Screws are disadvantageously associated with a hole in the closure part, which can in turn lead to leakages with respect to fluids. Such leakages, however, are to be avoided particularly in the region of the electric motors.

According to a further embodiment of the method in accordance with the invention, the housing part is formed as a motor housing case, the closure part is formed as a bearing plate and/or the carrier part is formed as a brush carrier part. "Bearing plate" means a closure part which is suitable for receiving a bearing. "Brush carrier part" means a carrier part which is suitable for carrying brushes for an electric sliding contact to the collector or to collector rings of the rotating part of the electric machine.

BRIEF DESCRIPTION OF THE DRAWINGS

The present invention will be explained in more detail hereinunder with the aid of the exemplified embodiments illustrated in the figures of the drawing in which.

Unless stated otherwise, in the figures of the drawing, like components, elements and features are designated with like reference numbers.

DESCRIPTION OF EXEMPLARY EMBODIMENTS

Figure 1:
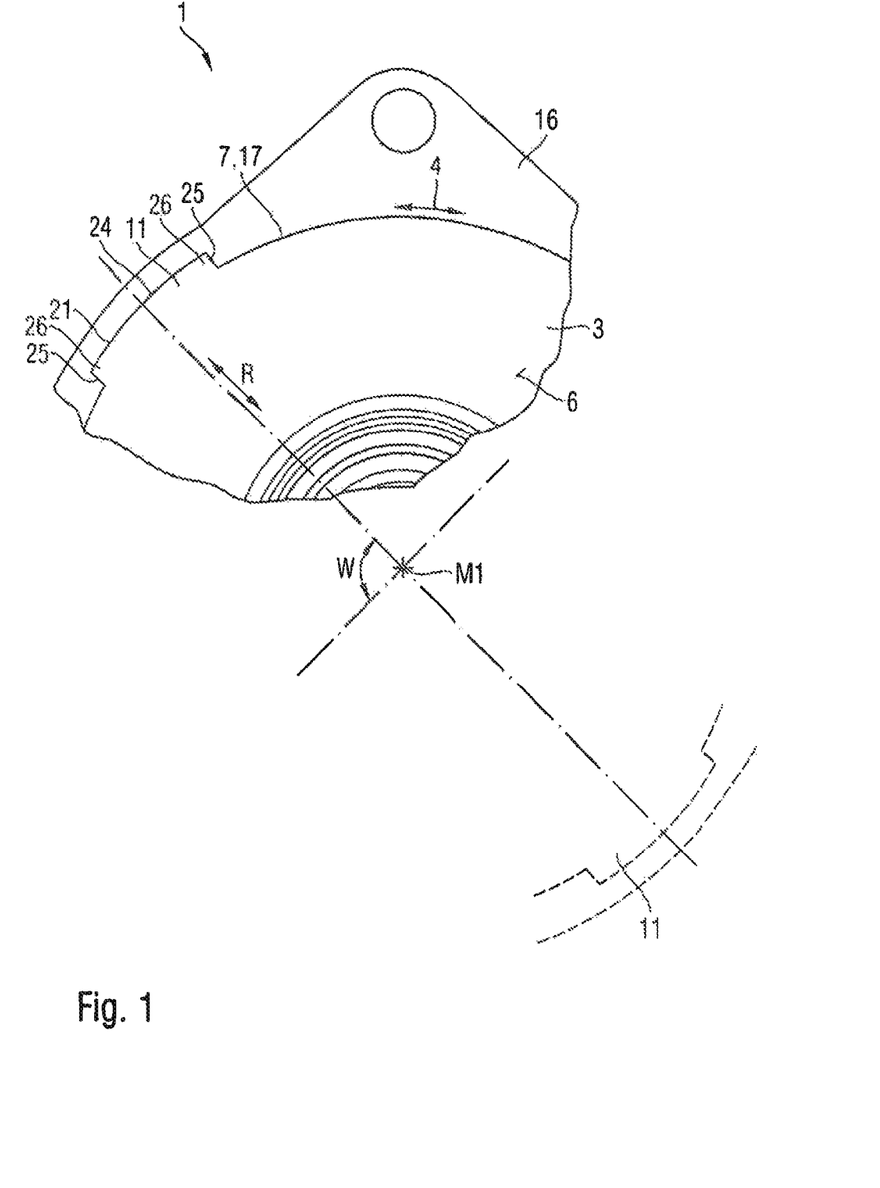
FIG. 1 shows a partially cut-away and partially schematic plan view of a housing arrangement in accordance with an exemplified embodiment of the present invention in a first state.
Figure 2:
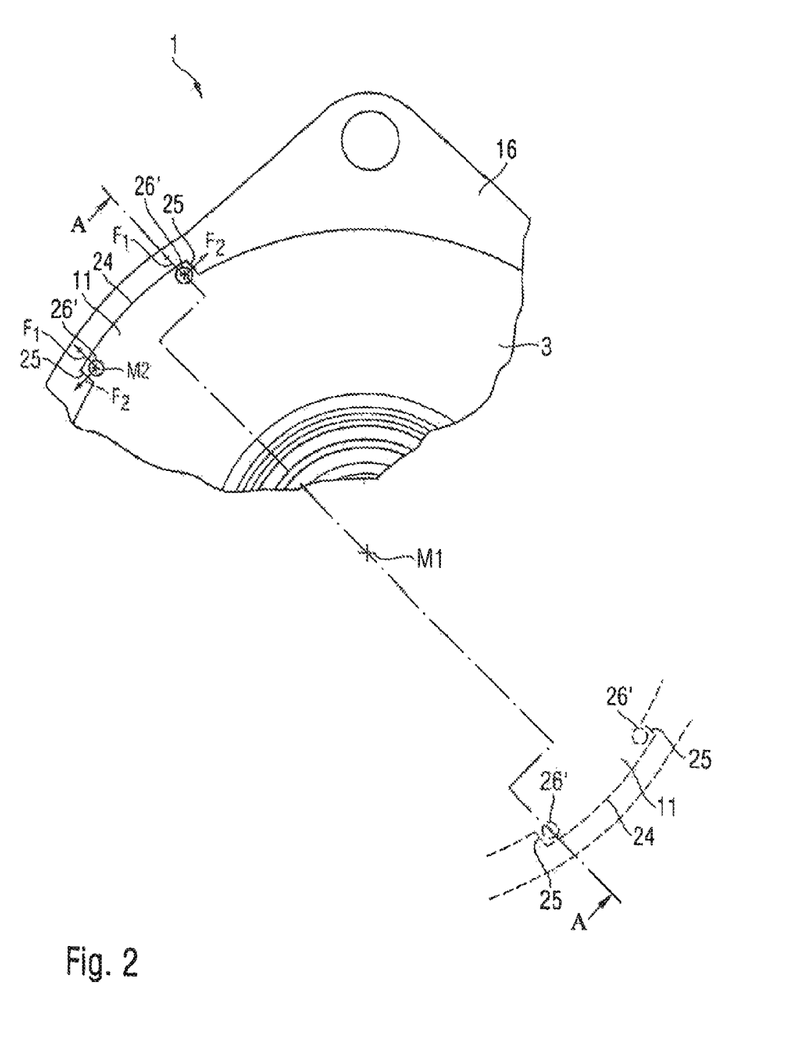
FIG. 2 illustrates the housing arrangement of FIG. 1 in a second state.
Figure 3:
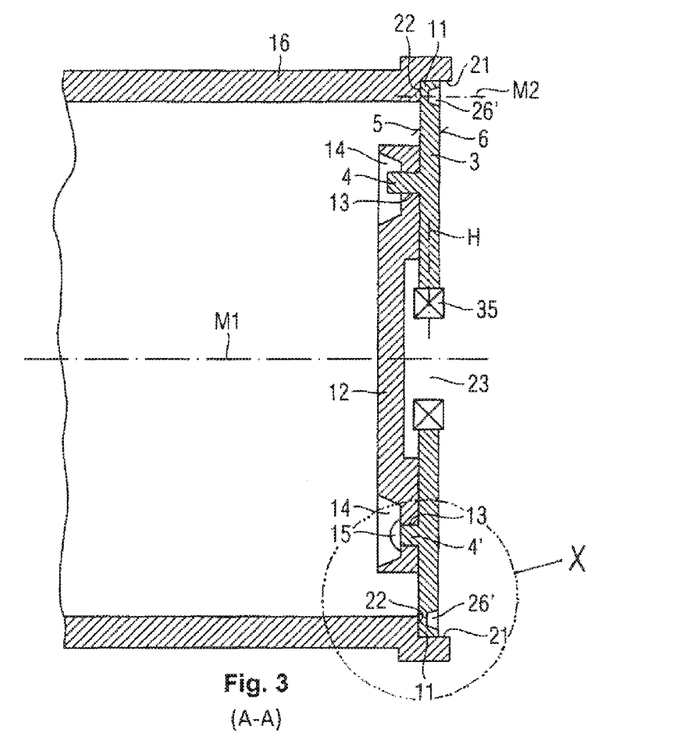
FIG. 3 illustrates a cross-sectional view A-A from FIG. 2.
Figure 4:
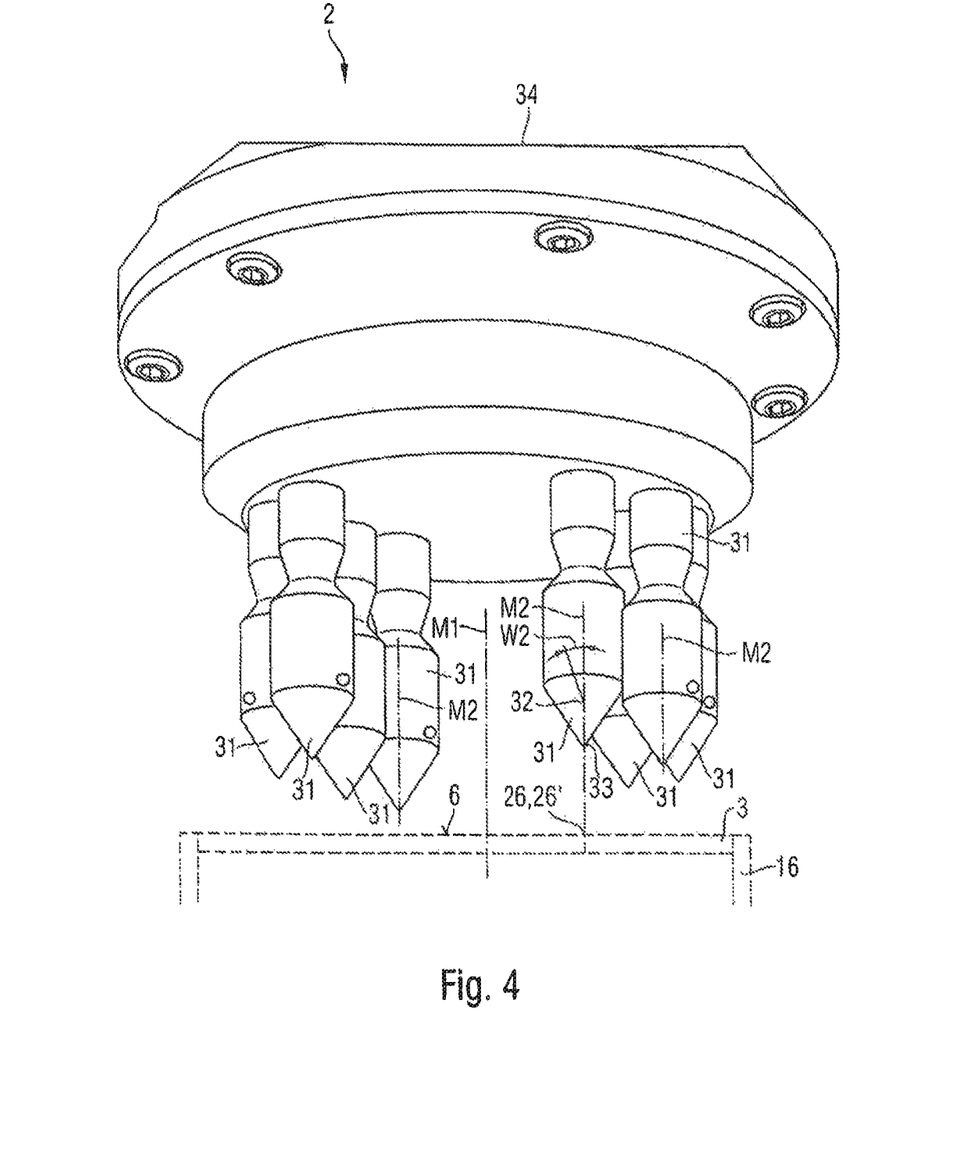
FIG. 4 illustrates a stamping apparatus in accordance with an exemplified embodiment of the present invention.
Figure 5:
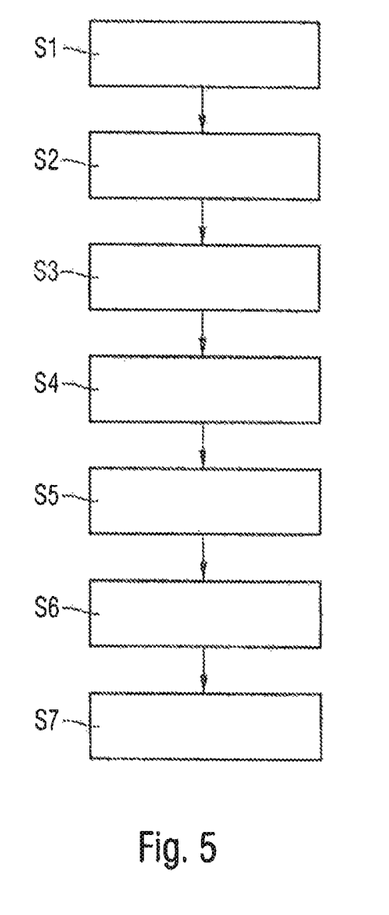
FIG. 5 illustrates a process flow in accordance with an exemplified embodiment of the present invention.
Figure 6:
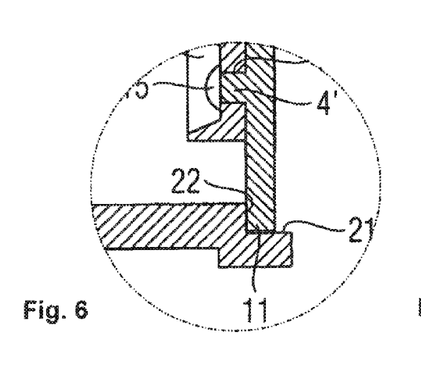
FIG. 6 illustrates a detail X indicated in FIG. 3 in a state before an indent is formed.
Figure 7:
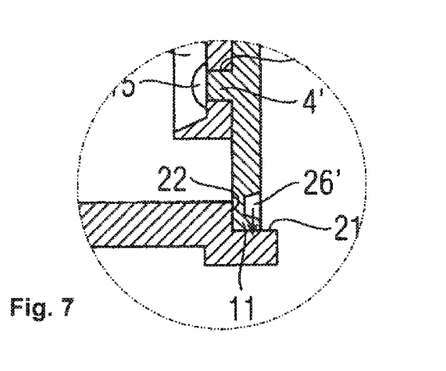
FIG. 7 illustrates a detail X indicated in FIG. 3 after an indent has been formed.

Exemplified embodiments of a housing arrangement 1, see FIGS. 1-3, of a method for producing this arrangement, see FIG. 5, and a stamping apparatus 2, see FIG. 4, for use in the method are explained in more detail hereinunder with reference to all the figures.

Step S1:

In a step S1, see FIG. 5, an e.g. approximately annular bearing plate 3, see FIG. 3, is first provided. The bearing plate 3 is preferably formed as one piece with a plurality of spigots 4. The spigots 4 extend essentially perpendicular to a main plane of extension H of the bearing plate 3. The spigots 4 are formed on a rear side 5 of the bearing plate 3.

FIG. 1 shows the front side 6 of the bearing plate 3. Furthermore, FIG. 1 also shows that a plurality of lugs 11 are formed on an outer circular periphery 7 of the bearing plate 3. Preferably, four of the lugs 11 are disposed along the periphery 7 of the bearing plate 3. These can, for example, each be disposed at an angle W of 90° to each other about a middle axis M1.

The bearing plate 3 is produced from metal, preferably steel.

Step S2:

In a step S2, a brush carrier part 12, see FIG. 3, is provided. The brush carrier part 12 has through-openings 13. The through-openings 13 can be formed in the region of indentations 14 in the brush carrier part 12.

The brush carrier part 12 is preferably produced from synthetic material.

Step S3:

In a step S3, the brush carrier part 12 is pushed with its through-openings 13 onto the spigots 4 of the bearing plate 3. Subsequently, the spigots 4 are shaped by means of wobble or radial riveting in such a way that a head 15 is formed as shown for spigot 4', see FIG. 3. The head 15 engages behind the brush carrier part 12 and therefore fixedly connects the brush carrier part 12 to the bearing plate 3. During radial or wobble riveting of the spigots 4, the introduction of force into the brush carrier part 12, which is inherently sensitive (because it is produced from synthetic material), is only slight and is precisely controllable.

Step S4:

In a step S4, a motor housing case 16 with a preferably annular cross-section is provided. The motor housing case 16 is formed with recesses 21 on its inner periphery 17, see FIG. 1. The recesses 21 are formed to be suitable to receive lugs 11. Furthermore, the motor housing case 16 is formed with a shoulder 22 as an abutment for the lugs 11 in the axial direction in relation to the middle axis M1.

The motor housing case 16 is formed from metal, preferably steel.

Step S5:

In a step S5, the unit consisting of the bearing plate 3 and brush carrier part 12 is inserted into the receiving region, designated generally as 23, see FIG. 3, in the motor housing case 16. The receiving region 23 is defined by the recesses 21, the inner periphery 17 and the shoulders 22.

During insertion of the bearing plate 3 into the motor housing case 16, the lugs 11 of the bearing plate 3 come into engagement with the recesses 21. This engagement ensures a positive locking connection between the bearing plate 3 and the motor housing case 16 in the peripheral direction U in relation to the middle axis M1. In the exemplified embodiment illustrated in FIG. 1, the lugs 11 are essentially rectangular, being defined by surfaces 24, 25 of the recess 21. The surfaces 25 thus lie opposite each other in the peripheral direction U and ensure the afore-mentioned positive locking connection in the peripheral direction U. The surface 24, on the other hand, ensures a positive locking connection in the radial direction R in relation to the middle axis M1.

Step S6:

In a step S6, the bearing plate 3 is fixedly connected to the motor housing part 16. To this end, regions 26, see FIG. 1, in corner regions of the essentially rectangular lugs 11 are each shaped in the form of an indent 26', see FIG. 2. For this purpose, the arrangement consisting of the bearing plate 3 and motor housing 16 is disposed below the stamping apparatus 2, see FIG. 4.

The stamping apparatus 2 has eight stamps 31. However, it would be equally possible to provide two, three or more stamps 31. The stamps 31 are each formed with a conical surface 32. The conical surface 32 forms a tip 33 in the direction of the bearing plate 3 disposed thereunder. The eight stamps 31 are attached to a holder 34 which, on the inside thereof, has a mechanism, not shown, for movement of each stamp 31 in the manner described below. This movement is explained in more detail hereinunder by way of example with the aid of only one stamp 31.

The stamp 31 is rotated about the middle axis M2 of a respective indent 26' which is to be formed. At the same time, the angle W2 by which the stamp 31 is inclined with respect to the middle axis M2 is varied. Furthermore, at the same time, the stamp 31 is advanced axially, i.e. along the middle axis M2 in the direction of the bearing plate 3. The contact point of the stamp 31 on the region 26 follows a hypocycloid, whereby the material essentially flows in an axial direction F1, F2 (see FIG. 2) and tangential direction in relation to the middle axis M2.

Each of the stamps 31 of the stamping apparatus 2 is moved in this way. The axial advancement can be effected by movement of the holder 34 along the axis M1, that is in the direction of the bearing plate 3, i.e. in this respect the stamps 31 are moved jointly.

The above-described movement of a stamp 31 corresponds to that in radial riveting. Alternatively, it would also be feasible to keep the angle W2 constant, wherein then the point of the stamp 31 on the region 26 follows a downwardly inclined spiral. The resulting movement corresponds to the movement during wobble riveting.

The formed indents 26' are of a shape which is convex in cross-section, see FIG. 3, and circular in plan view, see FIG. 2.

Step S7:

In a step S7, the housing arrangement 1 produced is further fitted out. Thus, for example, a bearing 35, see FIG. 3, can be installed in the bearing plate 3. Furthermore, the brush carrier part 12 can be provided with brushes, not shown. An electric motor is therefore ultimately produced.

The material flow in the radial direction, which results from the above-described wobble or radial shaping method, is identified in FIG. 2 with two arrows F1 and F2 for the indents 26'. The material flow F1, F2 causes the bearing plate 3 to be enlarged in the main plane of extension H, in which the indents 26' lie. As shown in FIG. 2, the material flow F1 causes clamping of the bearing plate 3 or of the mutually diagonally opposing lugs 11 with the surfaces 24 of the motor housing case 16. Furthermore, the material flow F2 leads to clamping of a respective lug 11 between the two surfaces 25 of the motor housing case 16.

By means of the stamping apparatus 2 in accordance with the present exemplified embodiment, the four lugs 11 can be formed at the same time with two indents 26' each. This produces a uniform force distribution during the shaping step, whereby a tipping of the bearing plate 3 about the middle axis M1 can be avoided. Furthermore, it saves time to form the plurality of indents 26' simultaneously.

At least the following further, advantageous embodiments E1 to E11 of the present invention are disclosed herein:

Embodiment E1

Method for producing a housing arrangement (1), in particular for an electric machine, wherein a region (26) of a closure part (3) is shaped in the form of an indent (26') in order thereby to press material of the closure part (3) against a housing part (16) for a non-positive connection between the closure part (3) and the housing part (16).

Embodiment E2

Method according to embodiment E1, wherein the shaping step is carried out by means of a stamp (31) which is rotated about a middle axis (M2) of the indent (26') to be formed and is inclined at a varying angle (W2) with respect to the middle axis (M2), wherein the stamp (31) is advanced axially in relation to the middle axis (M2) and the contact point of the stamp (31) on the region (26) follows a hypocycloid, whereby the material essentially flows in an axial direction (F1, F2) and tangential direction in relation to the middle axis (M2).

Embodiment E3

Method according to embodiment E1, wherein the shaping step is carried out by means of a stamp (31) which is rotated about a middle axis (M2) of the indent (26') to be formed and is inclined at a constant angle (W2) with respect to the middle axis (M2), wherein the stamp (31) is advanced axially in relation to the middle axis (M2) and the contact point of the stamp (31) on the region (26) follows an inclined spiral, whereby the material essentially flows in an axial direction (F1, F2) and tangential direction in relation to the middle axis (M2).

Embodiment E4

Method according to embodiment E2 or embodiment E3, wherein the region (26) is shaped by means of a conical surface (32) of the stamp (31).

Embodiment E5

Method according to any one of the preceding embodiments E1 to E4, wherein a plurality of regions (26) of the closure part (3) are each shaped in the form of an indent (26') at the same time.

Embodiment E6

Method according to any one of the preceding embodiments E1 to E5, wherein the closure part (3) is inserted into a receiving region (23) of the housing part (16) before the shaping step and is clamped to the receiving region (23) by means of the shaping step.

Embodiment E7

Method according to any one of the preceding embodiments E1 to E6, wherein the closure part (3) is formed with at least one lug (11) which engages into a corresponding recess (21) in the housing part (16), wherein the indent (26') is formed in the lug (11).

Embodiment E8

Method according to any one of the preceding embodiments E1 to E7, wherein an opening (13) in a carrier part (12) is placed onto a spigot (4, 4') on the closure part (3), wherein the spigot (4, 4') is shaped to engage behind (15) the carrier part (12).

Embodiment E9

Method according to any one of the preceding embodiments E1 to E8, wherein the housing part is formed as a motor housing case (16), the closure part (3) is formed as a bearing plate (3) and/or the carrier part is formed as a brush carrier part (12).

Embodiment E10

Housing arrangement (1), in particular for an electric machine
  having a housing part (16); and
  having a closure part (3);
wherein a region of the closure part (3) is shaped in the form of an indent (26'), whereby material of the closure part (3) is pressed against the housing part (16) for a non-positive connection between the closure part (3) and the housing part (16).

Embodiment E11

Stamping apparatus (2) for use in the method according to any one of the preceding embodiments E5 to E9,
  having a plurality of stamps (31) which can each be rotated at the same time about a middle axis (M2) of a respective indent (26') to be formed, can be inclined at a varying angle (W2) with respect to the middle axis (M2) and can be advanced axially in relation to the middle axis (M2), wherein the contact point of a respective stamp (31) on the region (26) can be moved along a hypocycloid in order thereby to displace the material essentially in an axial direction (F1, F2) and tangential direction in relation to the middle axis (M2), or
  having a plurality of stamps (31) which can each be rotated at the same time about a middle axis (M2) of a respective indent (26') to be formed, can be inclined at a constant angle (W2) with respect to the middle axis (M2) and can be advanced axially in relation to the middle axis (M2), wherein the contact point of a respective stamp (31) on the region (26) can be moved along an inclined spiral, in order thereby to displace the material essentially in an axial direction (F1, F2) and tangential direction in relation to the middle axis (M2).

Although the invention has been described with the aid of exemplified embodiments it is not limited thereto but can be modified in many ways. In particular, the designs and exemplified embodiments described for the housing arrangement in accordance with the invention can be applied in a corresponding manner to the method in accordance with the invention and to the stamping apparatus in accordance with the invention, and vice versa. Furthermore, reference is made to the fact that "a" does not exclude a plurality in this case.

REFERENCE LIST 1 housing arrangement
2 stamping apparatus
3 bearing plate
4 spigot
4' spigot
5 rear side
6 front side
7 periphery
11 lug
12 brush carrier part
13 through-opening
14 indentation
15 head
16 motor housing case
17 periphery
21 recess
22 shoulder
23 receiving region
24 surface
25 surface
26 region
26' indent
31 stamp
32 conical surface
33 tip
34 holder
35 bearing
F1 flow direction
F2 flow direction
H main plane of extension
M1 middle axis
M2 middle axis
R radial direction
U peripheral direction
W1 angle
W2 angle

The invention claimed is:
1. A method for producing a housing arrangement for an electric machine, the method comprising:
  providing a closure part having at least one spigot, the closure part being produced from metal,
  providing a carrier part having at least one opening, the carrier part being produced from synthetic material, placing the at least one opening of the carrier part onto the at least one spigot on the closure part, and shaping the at least one spigot by wobble riveting or radial riveting to form a head which fixedly connects the carrier part to the closure part.

2. The method according to claim 1,
wherein the closure part is formed as one piece with the at least one spigot.

3. The method according to claim 1,
wherein the at least one opening of the carrier part is formed as a through-opening in a region of an indentation in the carrier part.

4. The method according to claim 1, further comprising:
providing a housing part and shaping a region of the closure part so as to form an indent in order thereby to press material of the closure part against the housing part for a non-positive connection between the closure part and the housing part.

5. The method according to claim 4,
wherein the closure part, to which the carrier part is fixedly connected by means of the shaping of the at least one spigot, is inserted into a receiving region of the housing part before the step of shaping the region of the closure part so as to form the indent and the closure part is clamped to the receiving region by means of the step of shaping the region of the closure part so as to form the indent.

6. The method according to claim 4,
wherein the closure part is formed with at least one lug which engages into a corresponding recess in the housing part, wherein the indent is formed in the lug.

7. The method according to claim 4,
wherein the housing part is formed as a motor housing case.

8. The method according to claim 1,
wherein the closure part is formed as a bearing plate and/or the carrier part is formed as a brush carrier part.

* * * * *